Feb. 28, 1961     M. L. TUCKER     2,973,062
BRAKING SYSTEM
Filed Oct. 4, 1957     3 Sheets-Sheet 1
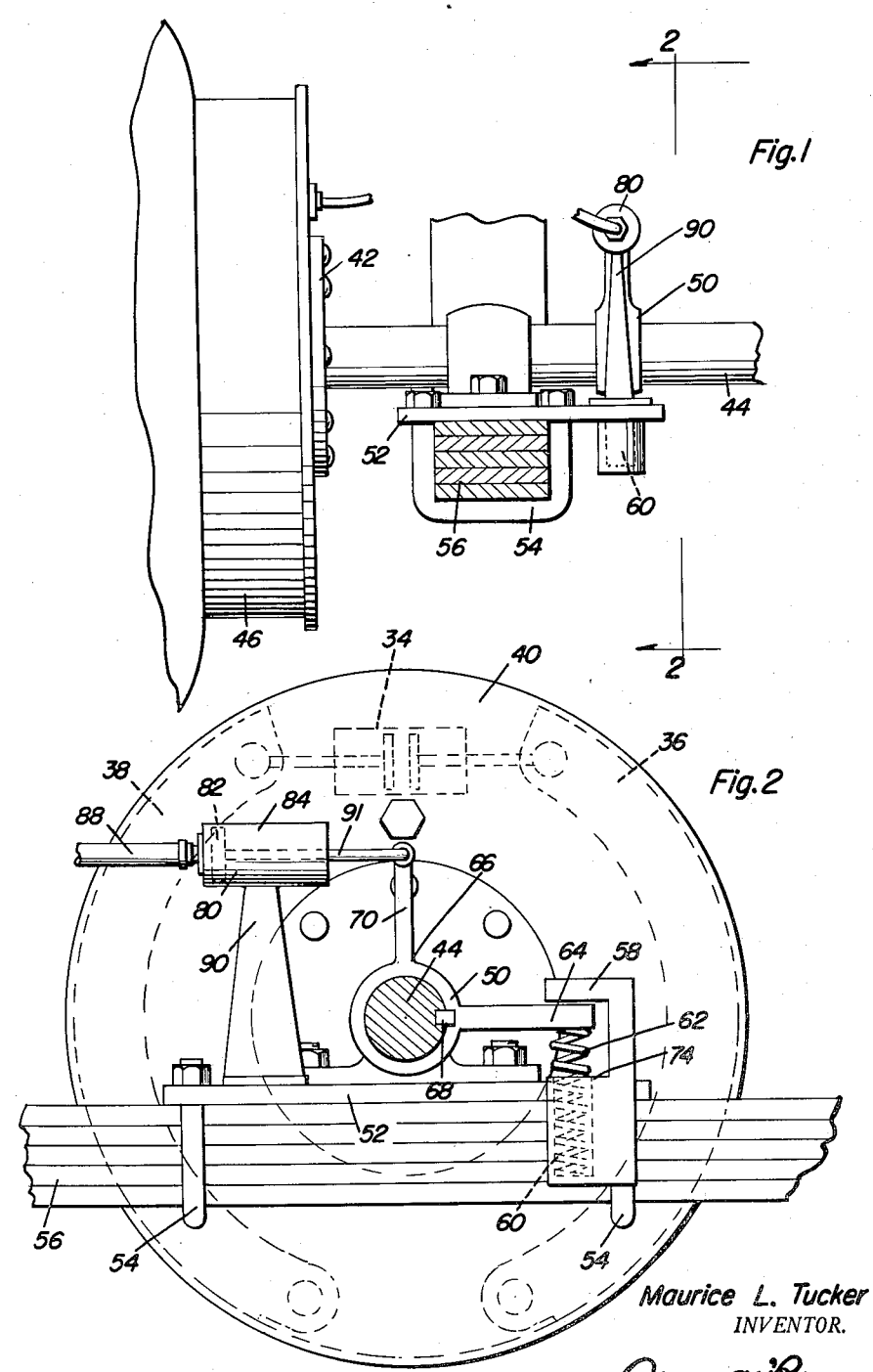
Maurice L. Tucker
INVENTOR.

Feb. 28, 1961     M. L. TUCKER     2,973,062
BRAKING SYSTEM
Filed Oct. 4, 1957     3 Sheets-Sheet 2
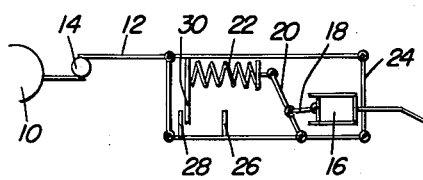
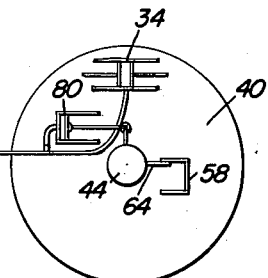
Fig.3
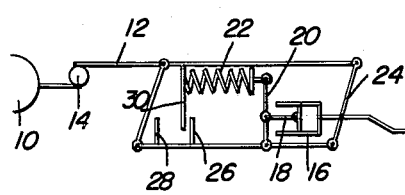
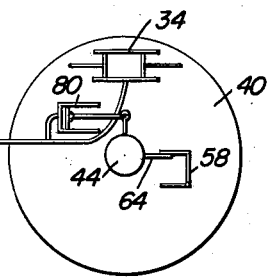
Fig.4
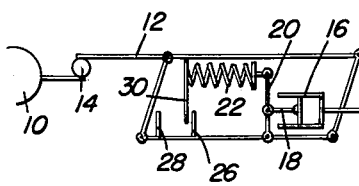
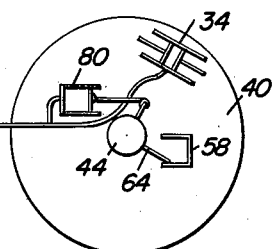
Fig.5
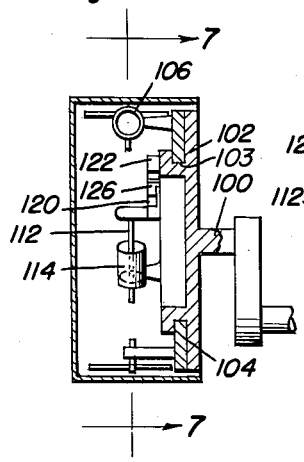
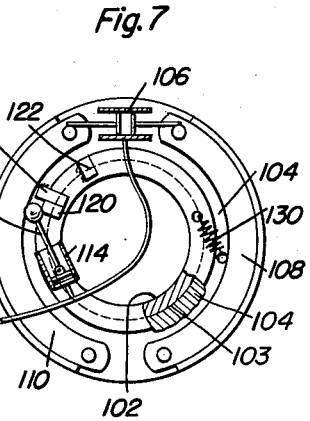
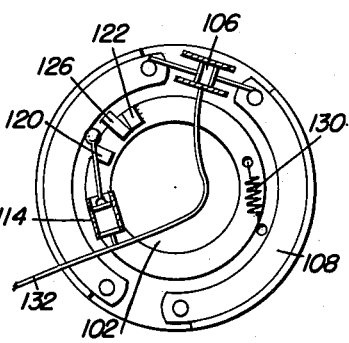
Fig.6    Fig.7    Fig.8
Maurice L. Tucker
INVENTOR.
BY *Clarence A. O'Brien*
*and Harvey B. Jacobson*
Attorneys Feb. 28, 1961   M. L. TUCKER   2,973,062
BRAKING SYSTEM
Filed Oct. 4, 1957   3 Sheets-Sheet 3
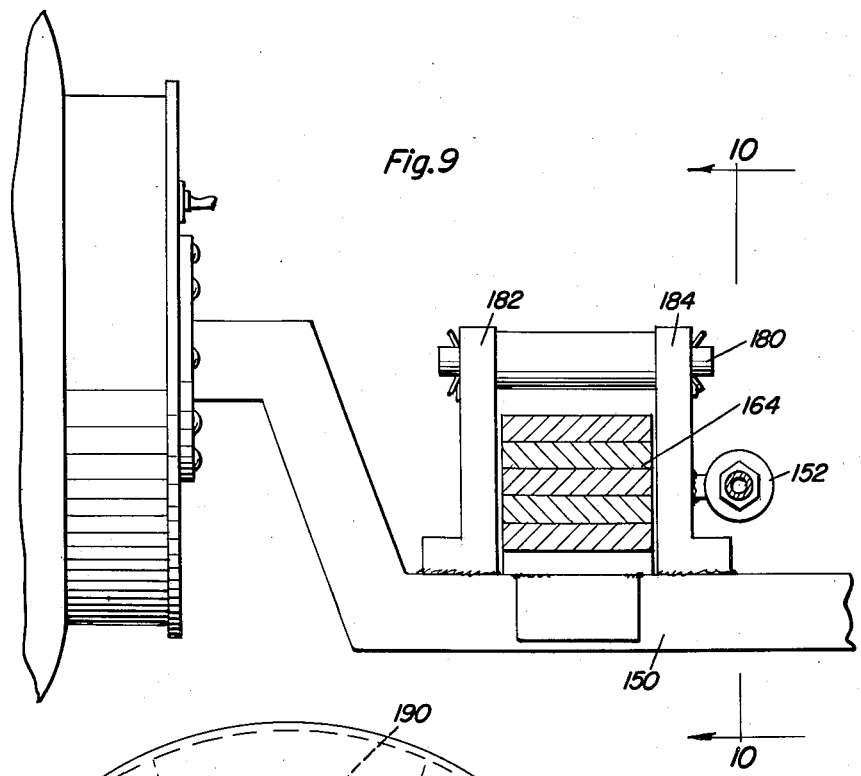
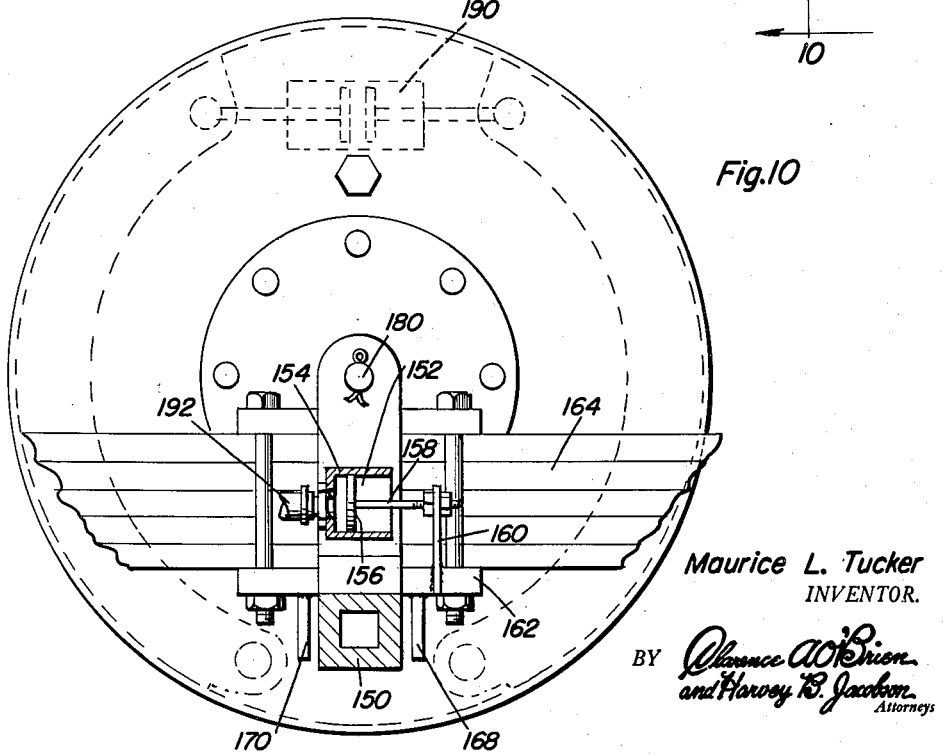
Maurice L. Tucker
INVENTOR.
BY *Clarence A. O'Brien*
*and Harvey B. Jacobson*
Attorneys

United States Patent Office 2,973,062
Patented Feb. 28, 1961

2,973,062

BRAKING SYSTEM

Maurice L. Tucker, 1342 McKaig, Troy, Ohio, assignor of fifty percent to Douglas S. Wade, Detroit, Mich.

Filed Oct. 4, 1957, Ser. No. 688,195

10 Claims. (Cl. 188—112)

This invention relates to an automatic brake system for a trailer and more particularly to a trailer braking system in which the trailer brakes are automatically applied when those of the tractor vehicle are applied and which has means to automatically release the brakes of the trailer when the trailer is being backed, especially up a hill or incline.

The invention involves a trailer or other towed vehicle which relies for braking on the pushing force generated at the hitch when the towed vehicle tends to travel in a forward direction faster than the towing vehicle, as for example, when the towing vehicle has its brakes applied. There are also provided means operatively connected with the trailer brakes which enable the towed vehicle to be moved backward, particularly up an incline, by automatically releasing the trailer brakes. The action and reaction at the trailer hitch for backing the trailer, is the same as for decelerating the towing vehicle and permitting inertia to carry the towed vehicle forward toward the towing vehicle and automatically apply the brakes. The difference, though, is that when the brakes are applied and the trailer is moving forward, the friction between the tire and road surface applies a torque in one direction onto the brake assembly back plate that supports the brake shoes, but when pushing the trailer backward, the frictional drag between the tire and the road surface applies a torque onto the back plate in the opposite direction.

In one embodiment of the invention the entire axle plus the back plate that carries the wheel cylinder, is capable of being rotated about 30° which movement operates means to release the brake fluid from the wheel cylinder into an expansible chamber, for example a cylinder whose piston is pulled outwardly of the cylinder in response to this means. When the brakes of the trailer are applied automatically in response to the trailer moving forward or tending to move forward at a greater rate than the towing vehicle, the previously described torque is in the opposite direction and the mechanical means which limit the extent of travel of the back plate prevent the back plate from moving.

Another embodiment of the invention is especially suitable for drop axle and independent suspension models. In order to accomplish the release of the brakes on the trailer when it is being backed, a releasing mechanism is provided within the brake drum. A floating ring is mounted on the back plate and the ring is free to oscillate between a pair of stops. The wheel cylinder, brake shoes and piston rod of the expansible chamber are connected to the floating ring. The cylinder is attached to the back plate. The fundamental operation, though, is the same as that described in connection with the embodiment of the invention that has the entire axle oscillatable through a limited range of travel.

Accordingly, it is an object of this invention to provide an air or hydraulic, preferably the latter, braking system for a towed vehicle, the braking system having a master cylinder that is operated in response to pushing or pulling forces between the towed vehicle and the trailer, and a wheel cylinder that is charged by the master cylinder but which has means responsive to the rearward movement of the towed vehicle for relieving the wheel cylinder of fluid thereby deenergizing the brake shoes that are operatively connected with the wheel cylinder.

Other objects and features of importance will become apparent in following the description of the illustrated forms of the invention.

Figure 1 is an elevational view of a part of the braking system of a trailer which is constructed in accordance with the invention.

Figure 2 is a sectional view taken on the line 2—2 of Figure 1, certain concealed parts being shown in dash lines therein.

Figure 3 is a schematic view showing the condition of the brake system in ordinary forward travel of the tractor vehicle and trailer.

Figure 4 is a schematic view showing the brake system when the brakes are applied during forward progress of the tractor vehicle and trailer.

Figure 5 is a schematic view showing the trailer brakes released when the trailer is being pushed backward by the towing vehicle.

Figure 6 is a sectional view of a modification of the invention.

Figure 7 is a sectional view taken on the line 7—7 of Figure 6 and showing the brakes released as the trailer is being pulled forward.

Figure 8 is a sectional view of the brake system of Figure 6 but showing the brakes deenergized while the trailer is being pushed backwards.

Figure 9 is a sectional view showing a further modification.

Figure 10 is a sectional view taken on the line 10—10 of Figure 9.

In the accompanying drawings there are several embodiments of my invention, each of which operates fundamentally in the same manner. Attention is directed first to the embodiment illustrated in Figures 1-5. A fragmentary part of a towing vehicle 10 is shown connected to the tongue 12 of a trailer by means of a hitch 14. A master cylinder 16 is connected to the trailer and has its plunger 18 attached to an operating lever 20. Spring 22 is attached to a side of parallel linkage 24 and serves as the driver for lever 20. Stops 26 and 28 limit the extent of travel of the spring 22 by being contacted by a bracket or stop 30 that is attached to the same side of the parallel linkage as the spring 22. The rest position for the master cylinder 16 is shown in Figure 3, this also being the position of the parts when the trailer is being towed by the tractor vehicle.

Brake line 32, see also Figure 2, extends from the master cylinder 16 and is operatively connected to wheel cylinder 34 whose piston rods are drivingly connected to brake shoes 36 and 38 and which wheel cylinder is carried by the back plate 40 that is bolted on mounting flange 42 carried by axle 44. When the brakes are applied on the towing vehicle or when the towed vehicle tends to go faster than the towing vehicle for some other reason, master cylinder 16 is actuated by lever 20 thereby causing the wheel cylinder 34 to be actuated and apply the brake shoes 36 and 38 against brake drum 46.

In the embodiment of Figures 1 and 2 axle 44 is carried by a bearing on the mounting plate 52. The mounting plate is fastened by U-bolts 54 to the spring 56 of the trailer and has a stop 58 attached to it. A well 60 is provided in the mounting plate and it accommodates spring 62 that seats in the well. An end of the spring reacts on arm 64 that constitutes a part of bell crank 66. The bell crank is connected by key 68 or by an equivalent fastener, to axle 44 and has a second arm 70 protruding therefrom. Arm 64 is capable of oscillating between stops 58 and 74 constituted by the upper edge of well 60. Spring 62 prevents rough and abrupt movements in one direction. As shown in Figures 2 and 4 when the trailer brakes are applied, arm 64 is pressed against stop 58, this being the normal operating position for arm 64. This is so because when the brake shoes are applied to the brake drum and the trailer is moving forward, the drum is gripped and a braking friction force is generated between the tire and the road surface. The reaction to this braking friction force is transmitted through the brake drum and brake shoes to the back plate 40 and the torque is in a direction which pushes arm 64 against stop 58.

The purpose of the described structure and the expansible chamber 80 formed by piston 82 in cylinder 84, is to enable the brakes on the trailer wheel to be released when the trailer is pushed backward and particularly, pushed backward up an incline. When the tractor vehicle pushes on the parallel linkage 24, as seen in Figure 5, the master cylinder 16 is actuated. This forces the brake fluid toward the wheel cylinder 34, but it does not project the wheel cylinder pistons outwardly because the frictional braking drag or resistance at the road surface and tire does not exist. As the brake shoes 36 and 38 start to engage the brake drum, a torque is applied to the back plate 40 tending to rotate the axle 44 in a direction to compress spring 62. The spring 62 yields enough so that stop 74 is contacted by arm 64. Due to the dimensioning of the parts and the volumetric capacity of the expansible chamber 80, enough brake fluid is bled through line 88 that connects the expansible chamber and the brake line 32 or wheel cylinder 34, to prevent the wheel cylinder pistons from moving enough to engage the brake shoes 36 and 38 with the brake drum with any degree of real stopping effort.

When the trailer is drawn forward by the trailer hitch 14 and tongue 12, the master cylinder is returned to the position shown in Figure 3 thereby drawing fluid from the expansible chamber 80. The forward movement of the trailer allows the shaft 44 to return to its normal position of Figure 2 so that arm 64 comes into contact with stop 58.

Arm 70 of the bell crank is ordinarily retained in the vertical position inasmuch as stand 90 on which the expansible cylinder 80 is secured, is arranged to hold the cylinder 84 in an approximately horizontal position. The piston rod 91 of the piston 82 is pivotally attached to the arm 70 to obtain the necessary action of the expansible chamber. The expansible chamber 80 which constitutes a relieving means for the fluid of the wheel cylinder, will have its pistons in their fully retracted positions and the piston in the expansible chamber 80 will be in the full inserted position during normal operation of the trailer. When the towing vehicle is decelerated, the towed vehicle will attempt to overrun it and the piston in the master cylinder enters its bore forcing the hydraulic fluid to enter the wheel cylinders and force the brake shoes against their drums. The action which takes place at this point has been described previously. The piston in the expansible chamber 80 is not forced out on its bore from the hydraulic fluid pressure because of the proportioning of the sizes of the master cylinder and chamber 80. The proportioning is such that the piston in the expansible chamber remains in its fully inserted position at all times except when the trailer is being backed. The piston 82 absorbs some of the braking torque although the balance of the torque is absorbed by the horizontal arm 64 of the bell crank 50 pushing against the stop 58. Although the description deals with one master cylinder and one wheel assembly, it is understood that the other wheel of the trailer will be constructed in the same way and will be operatively connected with brake line 32.

On trailers or other towed vehicles that have independent wheel suspensions and/or drop center axles, a different mechanical arrangement is provided (Figures 6-8). Axle 100 is shown with a back plate 102 fixed thereto. The mode of operation is in all essentials the same as that described in connection with the embodiment of Figure 1. However, the back plate 102 rotatably mounts within groove 103 a floating ring 104 on which the wheel cylinder 106, brake shoes 108 and 110 and the piston rod 112 of the expansible chamber 114 are attached. The cylinder 114 of the expansion chamber is anchored to the back plate 102, and the floating ring 104 is capable of a limited travel between stops 120 and 122 that are welded or otherwise fixed to the back plate 102. Arm 126 fixed to ring 104, strikes the stops 120 and 122 to limit the extent of travel of the floating ring 104. Spring 130 corresponds in function to spring 62, and is attached at its ends to the back plate and the ring 104 in order to return the ring 104 to the normal operating position (Figure 7).

When the trailer is being pulled forward and the towing vehicle is decelerated, the master cylinder sends fluid to the wheel cylinder 106 and this causes the brake shoes to bear against the brake drum. The reaction torque is applied directly to the back plate 102 through the arm 126 and stop 120. However, because of the frictional resistance force that is generated at the road surface and tire, as would be the case when the trailer is being pushed rearwardly (Figure 8), floating ring 102 is rotated until arm 126 contacts stop 122 and this expands the chamber 114 and it receives fluid from the brake line 132 so that the cylinder 106 is ineffective to apply the brakes. Hence, the trailer can be pushed rearwardly.

The embodiment of Figures 9 and 10 is an arrangement for a drop center axle 150. The brake drum, back plate and mechanism carried by the back plate are unaltered. Expansible chamber 152 is constructed of a cylinder 154 and a piston 156 that is operable in the cylinder. Piston rod 158 of the piston 156 is secured to an arm 160 that is carried by mounting plate 162. This mounting plate is held onto the spring 164 by welding and is located near the back plate of the wheel.

Axle swing limiting stops 168 and 170 are attached to and depend from the lower mounting plate 162. Pivot bolt 180 is passed through the mounting brackets 182 and 184 that are welded to the drop center axle 150.

In operation, the relief of fluid from the wheel cylinder 190 is achieved through a line 192 that extends either to the wheel cylinder 190 or to the brake line which feeds the wheel cylinder and which extends from the master cylinder. However, the stimulus for expanding the expansible chamber 152 is obtained by the flexure of the spring in a direction to achieve this, when the vehicle trailer is being pushed rearwardly. Stops 170 and 168 come into contact with the axle 150 during this operation and respectively limit the travel of the piston 156 in the cylinder 154 to the fully expanded or the fully retracted positions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:
1. A brake system for a vehicle drawn trailer wherein the trailer has a master cylinder responsive to traction and pushing forces between the trailer and vehicle, an axle mounted for rotary displacement, a back plate attached to the axle, a wheel cylinder carried by said back plate and mounted for rotary displacement with said axle, a brake line operatively connecting said master cylinder to said wheel cylinder to actuate the latter, a brake fluid relief device mounted on said trailer having an expansible chamber and operatively connected with the wheel cylinder, to receive brake fluid therefrom, mechanical means connected to said relief device and to said axle and responsive to limited rotary displacement of the wheel cylinder in one direction to effect movement of brake fluid from said wheel cylinder into said chamber and thereby bleed said wheel cylinder.

2. In a trailer which has a wheel brake assembly including wheel brake shoes and a wheel cylinder connected to said shoes for operating the latter and a master cylinder with a brake line connecting said wheel cylinder to said master cylinder, means connected to said master cylinder for actuating said master cylinder in response to the trailer tending to overrun the towing vehicle and thereby actuating said wheel cylinder, and means connected to said brake line for accumulating the brake fluid when the trailer is pushed by the towing vehicle, said brake fluid accumulating means including an expansible chamber, and means responsive to the rearward push motion of the trailer for expanding said chamber, the last mentioned means including a ring rotatably mounted on a wheel brake mounting, said ring carrying said brake cylinder and brake shoes and connected to a part of said expansible chamber, the other part of said expansible chamber being anchored to the brake mounting.

3. In a trailer which has a wheel brake assembly including wheel brake shoes and a wheel cylinder connected to said shoes for operating the latter and a master cylinder with a brake line connecting said wheel cylinder to said master cylinder, means connected to said master cylinder for actuating said master cylinder in response to the trailer tending to overrun the towing vehicle and thereby actuating said wheel cylinder, and means connected to said brake line for accumulating the brake fluid when the trailer is pushed by the towing vehicle, said brake fluid accumulating means including an expansible chamber, and means responsive to the rearward push motion of the trailer for expanding said chamber, the last mentioned means including a ring rotatably mounted on a wheel brake mounting, said ring carrying said brake cylinder and brake shoes and connected to a part of said expansible chamber, the other part of said expansible chamber being anchored to the brake mounting, stops on said brake mounting and said ring cooperating to limit the extent of travel of said ring with respect to the brake mounting.

4. A brake device for a trailer comprising yieldable connecting means operatively interconnecting a towing vehicle with the trailer, displacement responsive pressure generating means mounted on the trailer operatively connected to the yieldable connecting means for rendering it effective in response to any displacement of said yieldable connecting means from one limit position, displaceably mounted brake means on said trailer operatively connected by a fluid connection to said pressure generating means for actuation thereby and disabling means responsive to limited displacement of said brake means and operatively connected with said fluid connection for rendering the generating means ineffective to actuate said brake means.

5. The combination of claim 4, wherein said disabling means includes an expansible chamber mounted on the trailer and including a bell crank, the first arm of said bell crank attached to said expansible chamber, the second arm of said bell crank operable through an arc, and stops mounted on the trailer for limiting the extent of rotary travel of said second arm of said bell crank.

6. The combination of claim 4, wherein said trailer includes supporting spring means for yieldably supporting a wheel assembly and said brake means, said disabling means including a mounting plate secured to said trailer on which there are a pair of stops, an expansible chamber having one part anchored to said mounting plate, brackets secured to said supporting spring means so that said brackets are oscillatable in response to deflections of said spring means and the other part of said expansible chamber attached to one of said brackets.

7. The device as defined in claim 4, wherein said yieldable means includes a linkage spring biased to said one limit position and displaceable toward a second limit position in response to relative movement between said towing vehicle and trailer hitch.

8. The device as defined in claim 7, wherein said displacement responsive pressure generating means includes a hydraulic brake applying cylinder and piston connected to said linkage for actuation thereby when displaced toward its second position.

9. The device as defined in claim 8, wherein said brake means includes a brake wheel cylinder mounted on the trailer and hydraulically connected to the brake applying cylinder by said fluid connection for actuation of a brake device operatively connected to the wheel cylinder, said wheel cylinder being yieldably displaceable in one direction relative to the trailer.

10. The device as defined in claim 9 wherein said disabling means includes expansible reservoir means hydraulically connected to said brake applying cylinder by said fluid connection and operatively connected to said wheel cylinder for expanding the reservoir means in response to displacement of the wheel cylinder.

References Cited in the file of this patent

UNITED STATES PATENTS

| | | |
|---|---|---|
| 2,014,903 | Logan | Sept. 17, 1935 |
| 2,508,493 | Cook | May 23, 1950 |
| 2,698,069 | Henry | Dec. 28, 1954 |
| 2,736,395 | Keeler | Feb. 28, 1956 |
| 2,737,265 | Cushman | Mar. 6, 1956 |
| 2,746,574 | Smith et al. | May 22, 1956 |
| 2,846,030 | Wade | Aug. 5, 1958 |
| 2,917,135 | Hirzel | Dec. 15, 1959 |